United States Patent [19]
Floyd

[11] Patent Number: 5,204,065
[45] Date of Patent: * Apr. 20, 1993

[54] HIGH PRESSURE AND HIGH TEMPERATURE DIGESTION VESSEL

[76] Inventor: Terry Floyd, 4527 Island Fork Rd., Lake Wylie, S.C. 29710

[ * ] Notice: The portion of the term of this patent subsequent to Feb. 27, 2007 has been disclaimed.

[21] Appl. No.: 475,970

[22] Filed: Feb. 6, 1990

Related U.S. Application Data

[63] Continuation-in-part of Ser. No. 317,461, Mar. 1, 1989, Pat. No. 4,904,450.

[51] Int. Cl.$^5$ .............................................. B01L 3/00
[52] U.S. Cl. ................................. 422/113; 422/102; 422/104; 422/295; 215/260; 219/10.55 R; 220/89.2; 220/207; 220/366
[58] Field of Search ............... 422/78, 99, 102, 104, 422/113, 295; 220/89 A, 207, 209, 89.1, 366, 367, 89.2; 215/250, 260; 219/10.55 E, 10.55 R; 73/706, 714

[56] References Cited

U.S. PATENT DOCUMENTS

| | | | |
|---|---|---|---|
| 110,190 | 12/1870 | Bate | 422/113 |
| 2,489,787 | 11/1949 | Knowlton | 220/207 |
| 4,073,402 | 2/1978 | Wood | 220/207 |
| 4,151,253 | 4/1979 | Waggoner et al. | 422/102 |
| 4,192,192 | 3/1980 | Schnell | 73/706 |
| 4,248,831 | 2/1981 | Hughes | 422/102 |
| 4,613,738 | 9/1986 | Saville | 219/10.55 R |
| 4,655,070 | 4/1987 | Clift | 220/89 A X |
| 4,736,083 | 4/1988 | Saville | 219/10.55 R |
| 4,819,823 | 4/1989 | Kadakia et al. | 220/89.1 |
| 4,877,624 | 10/1989 | Floyd et al. | 422/113 X |
| 4,882,128 | 11/1989 | Hukvari et al. | 219/10.55 E X |
| 4,919,819 | 4/1990 | Robinson et al. | 210/662 |
| 4,944,923 | 7/1990 | Heinrichs et al. | 220/366 |

Primary Examiner—James C. Housel
Assistant Examiner—Jeffrey R. Snay
Attorney, Agent, or Firm—W. Thad Adams, III

[57] ABSTRACT

A high temperature, high pressure chemical digestion vessel comprising an inner container within which digestion is to take place under high temperature and high pressure conditions. The container is provided with a vent. A replaceable, rupturable pressure release disk is provided having a predetermined rupture pressure for being sealingly interposed in covering relation to the vent to seal the container and thereby enclose a substance to be digested in the container. The disk ruptures and releases pressure within the container if pressure within the container reaches the predetermined rupture pressure. The pressure release disk comprises a flat sheet material. A seal cap is provided for holding the pressure release disk in sealing relation to the vent in the container. An outer pressure resisting-casement is provided for receiving the container therein and providing support to the container. In one embodiment, a pressure chamber is defined between the seal cap and the pressure release disk to transmit pressure information to a pressure sensor exterior to the vessel and to isolate a test sample from the exterior of the vessel.

15 Claims, 6 Drawing Sheets

HIGH PRESSURE AND HIGH TEMPERATURE DIGESTION VESSEL

TECHNICAL FIELD AND BACKGROUND OF THE INVENTION

This application is a continuation-in-part of application Ser. No. 317,461, now U.S. Pat. No. 4,904,450, filed on Mar. 1, 1989.

This invention relates to a high pressure and high temperature digestion. The vessel is particularly adapted for use in a microwave oven and permits safe and effective chemical digestion for the purpose of chemical analysis. Microwave heating and digestion of organic samples in an enclosed high pressure and high temperature vessel has greatly shortened the amount of time required to perform these tests. The assembly solves several problems which have been observed in prior devices used for the same purpose. For example, U.S. Pat. No. 4,672,996 discloses a pressure vessel which includes a self-regulating valve positioned under a lid which is threaded onto the vessel. The valve includes a pressure-deformable, resilient wall member having a fluid vent port and an obstructing member which cooperates with the wall member to open the valve. While this device offers several advantages over prior devices, it nevertheless contains features which offer several problems.

The relief point of the valve is a function of the ability of the lid to deform and the torque with which the lid is tightened onto the vessel. Even with careful control of the torque, the deformation of the valve occurs at a temperature which cannot be accurately predicted. For this reason, both time and temperature remain variables since there is no direct temperature sensing within the vessel. Pressure resistance and distortion at various points on the vessel also vary.

The valve of the '996 Patent requires an expensive torque station to precisely tighten the lid on the vessel. The requirement of a torque station introduces a further variable, since it must be frequently calibrated and is subject to improper operation. Because of the design of the valve, vapors containing trace elements collect between the valve disk and the lid and condense when cooled. This liquid must be rinsed out with a known quantity of water and added back to the sample before the results of the digestion can be calculated. Even liquid trapped in the threads of the vessel can cause a variation in the results of the digestion.

The life of the device in the '996 Patent is limited to 30-50 tests, depending upon the pressure range of the test, since pressure tends to deform the vessel during each test. The pressure relief tube projects vertically out of the top of the vessel, meaning that the tube must be turned 180 degrees to carry any escaping vapor or liquid into a collection vessel. If the relief tube blows out of the valve, vapors may spray upwardly into the face of the operator.

Another prior art device is the Parr microwave acid digestion bomb. On occasion, the term "bomb" is quite apt. The hazards involved in using this product are recognized in literature distributed by the manufacturer, and include the possibility of uncontrolled explosion or discharge of contents under high temperature and pressure. Heating of the contents is solely by empirical determination of the proper combination of time and microwave power. In addition, a relatively expensive O-ring must be replaced quite frequently.

The known prior art devices do not offer a combination of a safe digestion vessel with precise and repeatable temperature and pressure control.

SUMMARY OF THE INVENTION

Therefore, it is an object of the invention to provide a safe microwave digestion vessel assembly.

It is another object of the invention to provide a microwave digestion vessel assembly which permits precise control of temperature and pressure.

It is another object of the invention to provide a microwave digestion vessel assembly which permits quick and inexpensive change of the pressure relief point of the vessel assembly.

It is another object of the invention to provide a microwave digestion vessel assembly which provides accurate and reproducible test results.

It is another object of the invention to provide a microwave digestion vessel assembly which substantially eliminates pressure and temperature fatigue which shortens the life of the assembly and increases the possibility of vessel failure.

These and other objects of the present invention are achieved in the preferred embodiments disclosed below by providing a high temperature, high pressure chemical digestion vessel comprising an inner container within which digestion is to take place under high temperature and high pressure conditions. The container is provided with a vent. A replaceable, rupturable pressure release disk is provided having a predetermined rupture pressure for being sealingly interposed in covering relation to the vent to seal the container and thereby enclose a substance to be digested in the container and to rupture and release pressure within the container if pressure within the container reaches the predetermined rupture pressure. The pressure release disk comprises a flat sheet material.

A container cap is provided for holding the pressure release disk in sealing relation to the vent in the container. An outer pressure resisting-casement is provided for receiving the container therein and providing support to the container.

According to one preferred embodiment of the invention, the cap comprises a lower cap part for being received on a mouth of the container and having a recess therein for receiving the pressure release disk therein in overlying relation to the vent, and an upper cap part for being received on the lower cap part and having means for imparting sealing pressure to the pressure release disk surrounding the vent. The lower cap part includes a seat whereby the lower cap part will matingly fit without mechanical attachment on the mouth of the container. The outer casement includes a casement cap for cooperating with the lower cap part for imparting sealing pressure to the lower cap part and the container.

Preferably, the upper cap part includes a seat whereby the upper cap part will matingly fit without mechanical attachment on the lower cap part remote from the container.

The container and the outer casement are each transparent to microwave radiation.

According to one preferred embodiment of the invention, the outer casement is formed of polyetherimide resin and the container is formed of perfluoralkoxy resin ("PFA") Teflon.

Preferably, the outer casement includes a through opening in a bottom surface to assist in removal of the container from the outer casement and the upper cap part includes an upwardly-projecting pressure-relief head of reduced dimension having a pressure-relief opening therein. The outer casement cap includes an opening therein for receiving the pressure-relief head therethrough.

According to another preferred embodiment of the invention, the microwave vessel assembly comprises an microwave transparent inner container having a flat bottom and integrally-formed cylindrical sidewalls the upper edge of which defines a cylindrical mouth for receiving material to be chemically digested under high pressure and high temperature.

A lower cap part is provided having a pressure vent therethrough and an annular seat formed on a bottom side thereof for being matingly seated without mechanical attachment on the cylindrical mouth of the container. The lower cap part has an annular recess in a top side thereof for receiving a replaceable, rupturable pressure release disk having a predetermined rupture pressure for being sealingly interposed in the recess in covering relation to the vent. The disk seals the upper and lower cap parts of the container and thereby encloses a substance to be digested in the container. The disk ruptures and releases pressure within the container if pressure within the container reaches the predetermined rupture pressure. The pressure release disk comprises a flat sheet material.

An upper cap part having a pressure vent therethrough and a bottom side is provided with an annular seat for being matingly fitting onto the top side of the lower cap part without mechanical attachment. The upper cap part cooperates with the recess of the lower cap part for containing the pressure release disk therein.

A cylindrical microwave transparent outer casement is provided and comprises a flat bottom and integrally-formed cylindrical sidewalls, the upper edge of which defines a cylindrical mouth. The sidewalls are of a diameter to receive the container therein in sliding surface-to-surface contact, but with some clearance to allow for expansion. The outer casement includes a casement cap for being attached to the upper edge of the cylindrical sidewalls and tightened to the upper and lower cap parts and the pressure disk therebetween compress in pressure-resisting relation on the mouth of the container.

According to another preferred embodiment of the invention, the outer casement includes a through opening in the bottom to assist in removal of the container from the outer casement.

According to yet another preferred embodiment of the invention, the upper cap part includes an upwardly-projecting pressure-relief head of reduced dimension having a pressure-relief opening therein. The outer casement cap includes an opening therein for receiving the pressure-relief head therethrough.

Preferably, the casement cap and the upper cylindrical walls of the casement include mating threads.

According to yet another preferred embodiment of the invention, the high temperature, high pressure chemical digestion vessel comprises a microwave transparent inner container having a bottom and integrally-formed cylindrical sidewalls, the upper edge of which sidewalls defines a cylindrical mouth for receiving material to be chemically digested under high pressure and high temperature. An enlarged-diameter flange cooperates with the cylindrical mouth of the inner container and a seal cap is provided having a pressure vent therethrough and an annular seat for being positioned and seated on the flange of the inner container without mechanical attachment for receiving and retaining by pressure engagement between the flange and the seal cap a replaceable, rupturable pressure release disk formed of a flat sheet material having a predetermined rupture pressure.

A microwave transparent outer casement comprising a bottom and integrally-formed cylindrical sidewalls is provided, the upper edge of which defines a cylindrical mouth for supporting the enlarged flange of the inner container. The sidewalls of the outer casement are of a diameter to receive the inner container therein in sliding surface-to-surface contact. A casement cap is provided for being attached to the upper edge of the cylindrical sidewalls of the outer casement and tightened into pressure-resisting relation with the inner container. The disk and the seal cap cooperate to seal the inner container and thereby enclose a substance to be digested in the inner container. The seal is adapted to rupture and release pressure within the inner container if pressure within the inner container reaches the predetermined rupture point.

Preferably, the inner container is shorter in length than the length of the outer casement by an amount sufficient whereby when the inner container is properly received in the outer casement an expansion gap is defined between the bottom of the inner container and the bottom of the outer casement to accommodate expansion of the inner container as microwave digestion takes place.

According to one preferred embodiment of the invention, the flange includes a raised rim integrally formed around the periphery of the flange and defining an interior, lower shoulder for receiving the pressure release disk.

According to another preferred embodiment of the invention, the seal cap includes a centrally-disposed bottom surface for being received into the mouth of the inner container and supporting the pressure release disk in the mouth of the inner container and an integrally-formed peripheral shoulder of reduced thickness for being positioned on and being supported on the lower shoulder of the inner container with the pressure release disk positioned therebetween.

According to yet another preferred embodiment of the invention, the peripheral shoulder of the seal cap defines an annular groove having a bearing edge for sealingly bearing against the pressure release disk around its entire periphery.

According to yet another preferred embodiment of the invention, the outer casement is dimensioned for receiving the inner container therein along substantially the entire length of the inner container and providing support to the inner container along substantially the entire length of the inner pressure.

According to one preferred embodiment of the invention, the seal cap includes a raised peripheral rim formed on the bottom of the seal cap for sealingly engaging the pressure relief disk adjacent its periphery. The rim defines a centrally-disposed void between the bottom of the seal cap and the pressure relief disk communicating with the pressure vent for being filled with a pressure transmitting fluid sealingly separated from the substance to be digested in the vessel and responsive to pressure-induced movement of the pressure relief disk. A fluid connector is provided for interconnecting the seal cap with a pressure transducer for transmitting pressure-induced movement of the pressure-transmitting fluid to a pressure transducer whereby pressure in the inner container can be continually monitored without permitting of the substance being digested in the inner container to escape.

Preferably, the bottom of the seal cap interior of the raised rim is concave.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Embodiment of FIGS. 1-4

Figure 1:
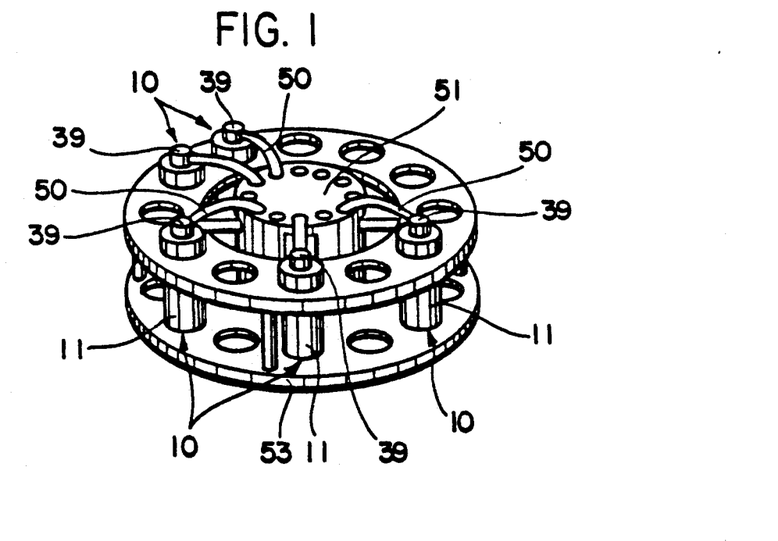
FIG. 1 is a perspective view of a vessel assembly rack into which a number of vessel assemblies are placed for processing samples in a microwave oven.
Figure 2:
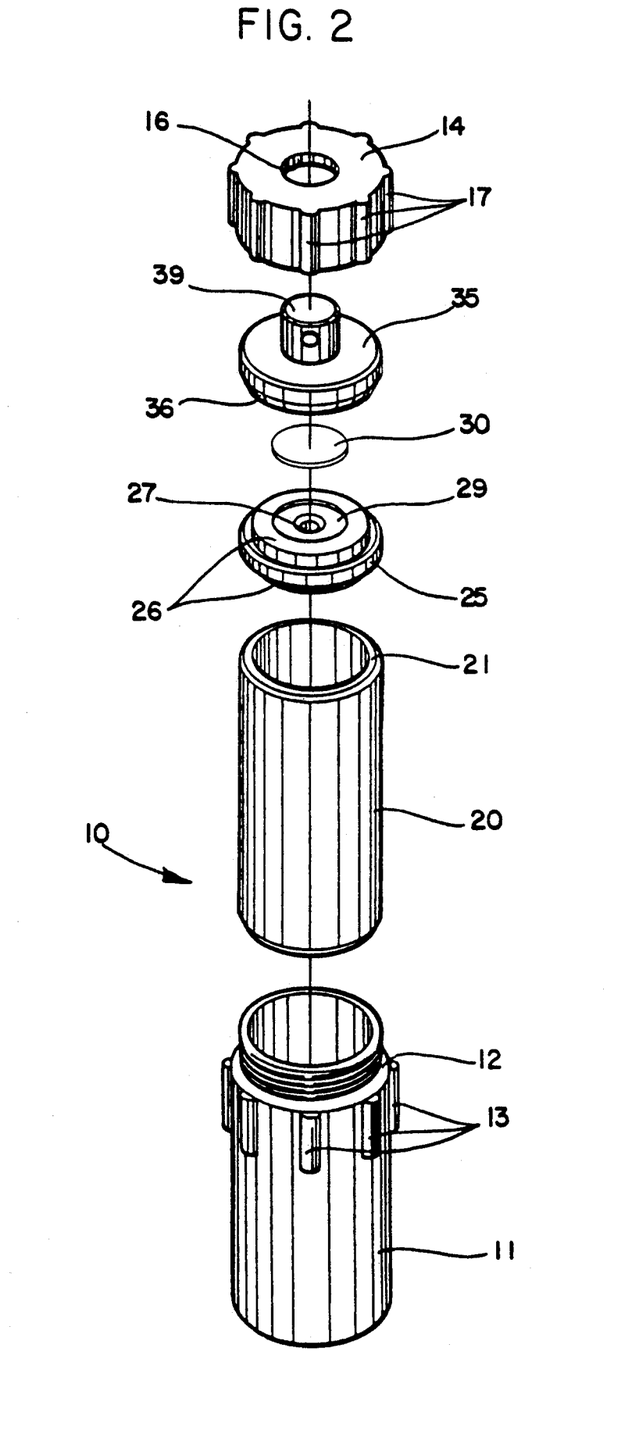
FIG. 2 is an exploded perspective view of a vessel assembly according to the present invention.
Figure 3:
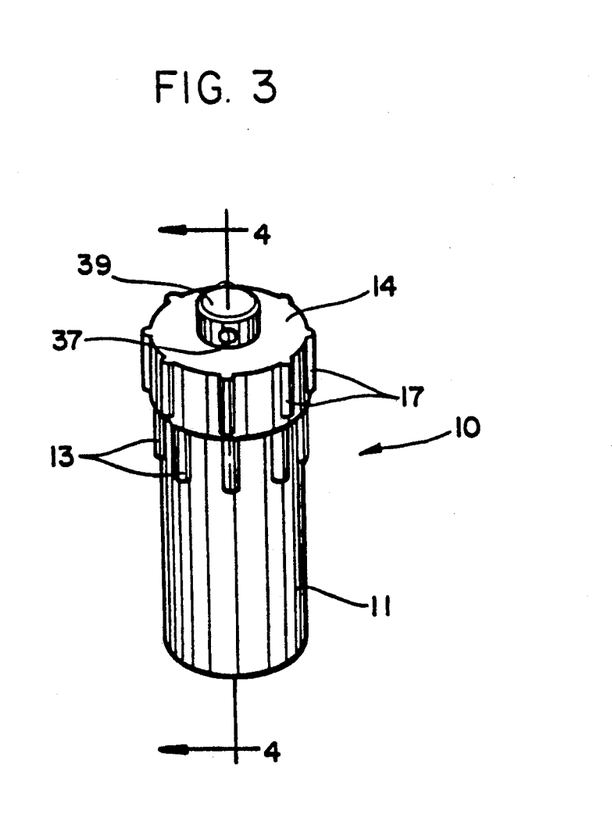
FIG. 3 is a perspective view of an assembled vessel assembly according to one embodiment of the present invention.

Referring now specifically to the drawings, a microwave digestion vessel assembly according to the present invention is illustrated in FIGS. 1-4 and shown generally at reference numeral 10. Referring now to FIG. 2, vessel assembly 10 includes a cylindrical outer casement 11 molded of polyetherimide resins. This material is microwave transparent. Threads 12 are molded into the top edge of casement 11 as are gripping lugs 13. Casement 11 includes an access opening 18 in the bottom wall into which can be inserted a finger or other object to push out the contents of casement 11. A cylindrical casement cap 14, also molded of polyetherimide resins, is provided with internal threads 15 (see FIG. 4) which mate with threads 12 of outer casement 11 so that cap 14 may be threaded onto casement 11 to a desired tightness. Cap 14 includes a centrally-formed opening 16 and molded gripping lugs 17.

Vessel assembly 10 also includes a cylindrical inner container 20 molded of perfluoralkoxy resin Teflon, a chemically-inert material which is also resistant to degradation under high temperature and pressure. Container 20 is sized to fit in a close surface contact into outer casement 11, but not so close that sliding contact is prevented. Outer casement 11 provides support to the side walls of container 20 when under pressure.

The upper, annular edge 21 of container 20 is formed with a convex profile. An annular lower cap part 25 molded of perfluoralkoxy resin has an annular concave seat 26 formed on the bottom side thereof which mates with edge 21. There is no mechanical interconnection between lower cap part 20 and container 20, such as by threads or a bayonet mount. Rather, lower cap part 20 merely sits on edge 21. In the preferred embodiment described here and shown in the drawing, the structure of lower cap part 25 is symmetrical top to bottom, so that either side of lower cap part 25 may be the top or bottom. This avoids the possibility that incorrect top-to-bottom installation of lower cap part 25 would cause a safety or operational problem.

Lower cap part 25 has a concentric through pressure vent 27 surrounded on both sides of lower cap part 25 by an annular recess 29. Recess 29 is shaped and sized to receive a circular replaceable, rupturable pressure disk 30. As is shown by continued reference to FIG. 2, disk 30 is formed of a flat sheet material, preferably of perfluoralkoxy resin which fits loosely into recess 29. The pressure relief point of the vessel assembly 10 is therefore easily varied by using a disk having suitable, predetermined rupture point. For example, a disk 30 fabricated of perfluoralkoxy resin will rupture at the following pressures for a given thickness:

| Thickness (in.-cm) | Relief Pressure (psi-kg./sq. m.) |
|---|---|
| .002/.005 | 90/63,270 |
| .003/.008 | 125/87,875 |
| .005/.013 | 160/112,489 |
| .007/.018 | 210/147,630 |

The disks 30 themselves are extremely inexpensive and avoid the necessity of torquing or otherwise adjusting the other parts of the vessel assembly 10. Disk 10 has no frame or other holding or support structure. The disk 10 is placed loosely in recess 29 and is sized to substantially overlay and extend radially-outwardly beyond the pressure vent 27 but at least slightly smaller in circumference than recess 29.

Disk 30 is held in sealing relation in recess 29 by upper cap part 35, also molded of perfluoralkoxy resin. As is best shown by reference to FIG. 4, the underside of upper cap part 35 includes an integrally-formed, raised annular ridge 36 which presses against disk 30 around pressure vent 27 and seals against fluid and pressure flow through pressure vent 27. As with lower cap part 25 on container 20, upper cap part has an annular seat 36 which cooperates with the adjacent surface of lower cap part 25. No mechanical attachment is provided between lower cap part 25 and upper cap part 35.

Figure 4:
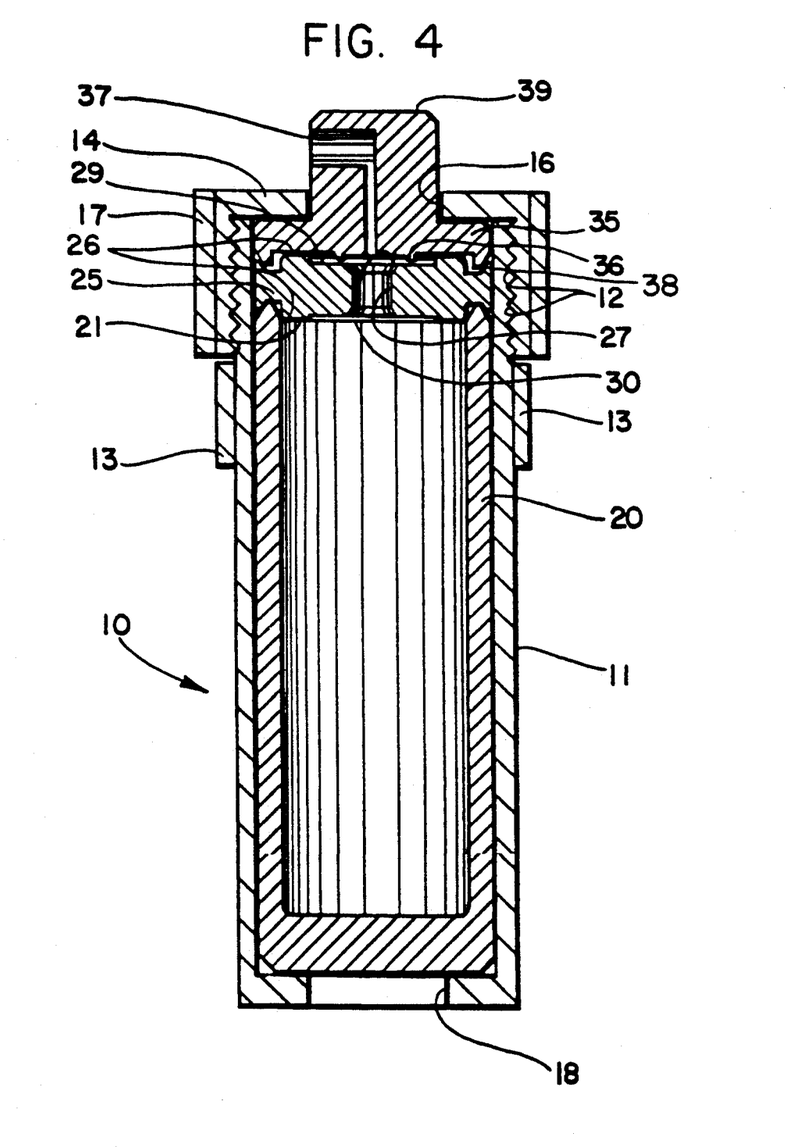
FIG. 4 is a vertical cross-section taken along line 4—4 of the vessel assembly shown in FIG. 3.

Upper cap part 35 is provided with a pressure relief vent 37 coaxial with pressure vent 27 in lower cap part 25. Upper cap part 35 includes a raised pressure relief head 39 of reduced diameter sized to fit through and project upwardly through opening 16 in casement 14. As is also shown in FIG. 4, pressure relief vent 37 makes a right angle turn and exits head 39 on its vertical side surface. Any vapor or liquid exiting vent 37 will travel horizontally and is therefore less likely to be directed into the face of the operator.

As is shown in FIG. 1, a tube 50 is fitted into pressure relief vent 37 and into a collection receptacle 51 so that any material discharged from a vessel assembly 10 upon rupture of disk 30 is contained.

FIG. 4 illustrated a preferred profile shape for the mating edges of container 20, lower cap part 25 and upper cap part 35. The vessel assembly 10 is assembled by placing container 20 into outer casement 11. Lower cap part 25 is placed onto the top of container 20, and a disk 30 of suitable thickness into recess 29. Upper cap part 35 is placed onto lower cap part 25 and casement cap 14 is placed over upper cap part 35 and tightened down by threads onto outer casement 11. Tightening casement cap 14 drives annular ridge 36 into disk 30, sealing it against the upper side of lower cap part 25, and also seals the edges of the component parts of vessel assembly 10 against each other by controlled deformation of the profile shapes of the mating edges. One or more vessel assemblies 10 are then placed in a rack 53 which includes the collection receptacle 51. Rack 53 is placed in a microwave oven (not shown). Time and power settings for the microwave oven are determined empirically.

Primary structural integrity of the vessel assembly 10 is provided by the high strength outer casement and casement cap 11 and 14. Use of the outer casement 11 virtually eliminates stress and distortion of the inner container, provides excellent strength and reproducible results for temperatures up to 250 C. Outer casement 11 also acts as an insulator and therefore promotes uniform heating. The outer surface temperature of casement 11 and cap 14 seldom exceeds 50 degrees C.

The design of casement 11 and container 20 prevents cap 14 from being turned and loosened without excessive force until the vessel assembly has been properly cooled. Use of pressure disks 30 with variable relief points can assist in establishing test procedures, particularly where samples such as petroleum products and organic materials may require venting. Furthermore, inspection of the relief disk is positive evidence of loss of sample during the test run. After the test run is over and the vessel assembly 10 has properly cooled, the assembly is disassembled by removing cap 14 and pushing container 20 out of casement 11 with the pressure relief head 39 of upper cap part 35 or other object through access opening 18.

As noted immediately above, pressure relief head 39 is sized to fit through access opening 18 in the bottom of casement 11. This feature not only permits removal of container 20 after the test run is over, but greatly facilitates the addition of reagents or other substances to container 20 when desired. After proper cooling, casement cap 14 can be loosened and removed from casement 11, permitting upper cap part 35 to be removed. Upper cap part 35 is placed on a flat surface and the remaining assembly of inner container 20 within outer casement 11 is positioned over upper cap part 35 and lowered onto it. As the pressure relief head 39 extends upwardly into outer casement 11 through access opening 18, it pushes inner container 20 upwardly. The distance that inner container 20 is pushed upwardly is sufficient to position lower cap part 25 above the top opening of outer casement 11. Lower cap part 25 can then be easily removed with tongs so that material may be introduced into or withdrawn from inner container 20 or the contents of inner container 20 merely observed. When appropriate, lower cap part 25 is then replaced on inner container 20 after which outer casement is lifted off of upper cap part 35. By placing upper cap part 35 back on top of lower cap part 25 and pressing downwardly, the assembly is repositioned for reapplication of casement cap 14. Then, if necessary, the entire vessel assembly 10 can be placed back in the microwave for further heating.

The design described above also facilitates empirical determination of appropriate time and power settings for the microwave digestion oven. It has been observed that the rupturable pressure disk 30 deforms upwardly into pressure vent 27 progressively as temperature and pressure within inner container 20 increase and before the disk actually ruptures. If the vessel assembly 10 is removed from the microwave digestion vessel and cooled prior to rupture, the extent of deformation of disk provides an indirect indication of the proximity of the pressure within inner container to the relief point of disk 30.

Parts molded of polyetherimide resin, such as the casement 11 and cap 14 have demonstrated excellent resistance to gamma radiation. Testing has revealed a loss of less than 6% tensile strength after cumulative exposure to 500 megarads at a rate of one megarad per hour using cobalt 60.

The high strength outer casement 11 eliminates the need for replacement due to mechanical failure. This reduces the cost per test down to approximately the cost of the replaceable disk 30. While eventual replacement of the inner container 20 may be required because of contamination of the inner walls after many uses, the replacement cost of a container 20 is minimal in comparison to replacement of entire assemblies of the type currently being used.

Figure 5:
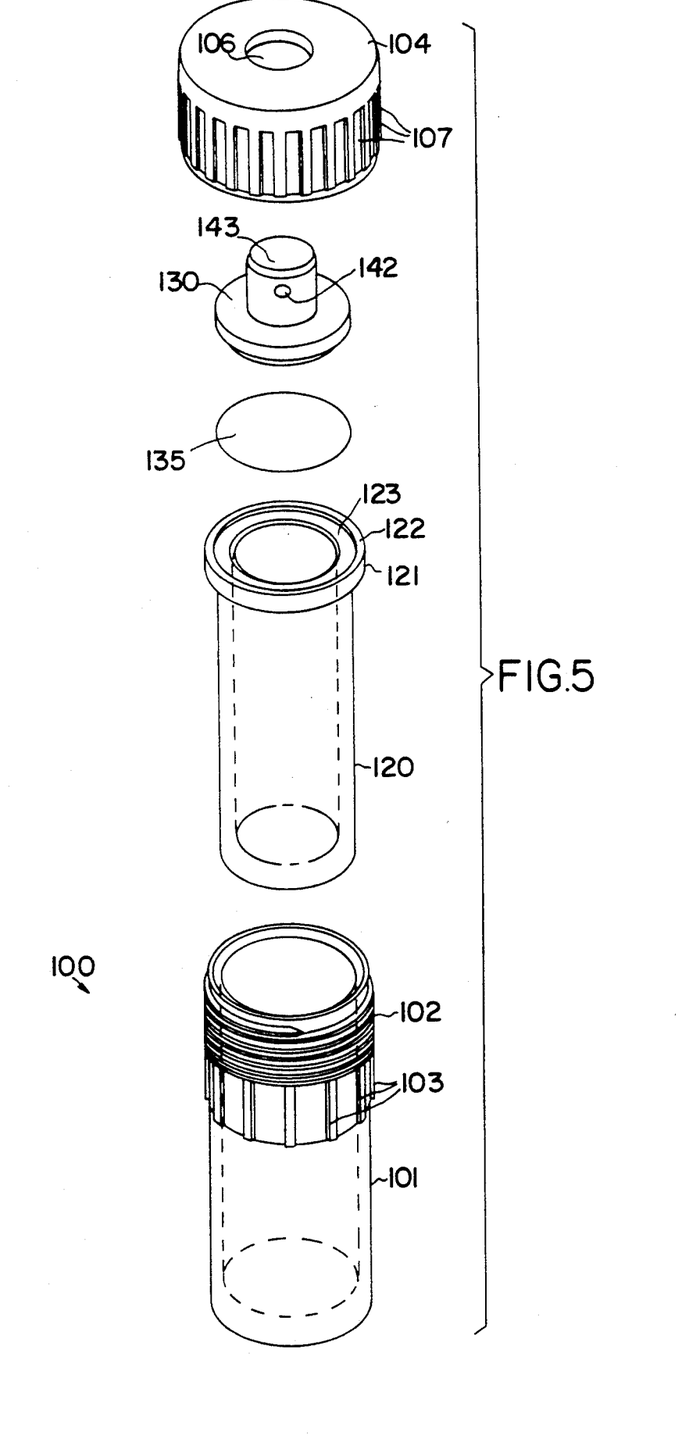
FIG. 5 is an exploded view of a vessel assembly according to another embodiment of the invention.
Figure 6:
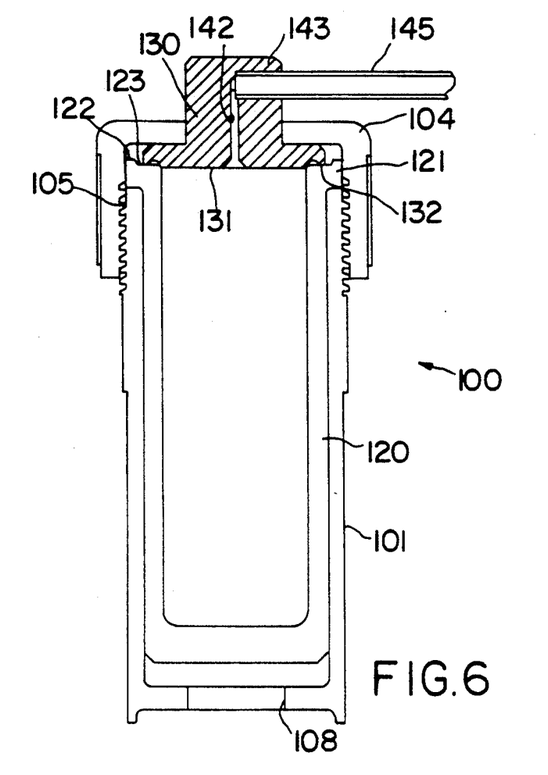
FIG. 6 is a vertical cross-sectional view of the vessel shown in FIG. 5.
Figure 7:
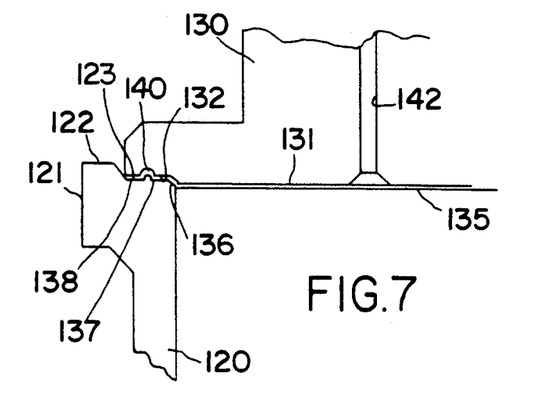
FIG. 7 is an enlarged, fragmentary cross-sectional view of the sealing area of the seal cap and inner container shown in FIGS. 5 and 6.

Embodiment of FIGS. 5-7

Referring now to FIGS. 5 and 6, a vessel assembly 100 according to a modified embodiment of the invention includes a cylindrical outer casement 101 molded of polyetherimide resins. This material is microwave transparent. Threads 102 are molded into the top edge of casement 11 as are gripping lugs 103. Casement 101 includes an access opening 108 (see FIG. 6) in the bottom wall into which can be inserted a finger or other object to push out the contents of casement 101. A cylindrical casement cap 104, also molded of polyetherimide resins, is provided with internal threads 105 (see FIG. 6) which mate with threads 102 of outer casement 101 so that cap 104 may be threaded onto outer casement 101 to a desired tightness. Cap 104 includes a centrally-formed opening 106 and molded gripping lugs 107.

Vessel assembly 100 also includes a cylindrical inner container 120 molded of perfluoralkoxy resin Teflon, a chemically-inert material which is also resistant to degradation under high temperature and pressure. Container 120 is sized to fit in a close surface contact into outer casement 101, but not so close that sliding contact is prevented. Outer casement 101 provides support to the side walls of inner container 120 along substantially the entire length of container 120 when under pressure.

As is best shown in FIG. 6, inner container 120 is somewhat shorter in length than the outer casement 101, thereby leaving an expansion gap in the bottom of the vessel 100 to accommodate expansion of inner container 120 during the microwave digestion process. This will prevent cracking of the outer casement 101 and cap 104 under extreme temperature and pressure conditions. The bottom on inner container 120 may be flat or convex, such as hemispherical.

The upper edge of inner container 120 comprises an integrally-formed enlarged diameter flange 121 which is dimensioned to sit on top of the upper walls of outer casement 101 defining the mouth. The outer periphery of flange 121 defines a raised rim 122.

A shoulder 123 interior of rim 122 on flange 121 supports a seal cap 130. Still referring to FIG. 6, seal cap 130 includes a bottom which has a relatively thick central portion 131 which fits into the mouth of the inner container 120 and a peripheral shoulder 132 of reduced thickness which sits on and mates with shoulder 123 of flange 121.

Referring now to FIG. 7, a more detailed view of the relationship between shoulders 123 and 132 is shown. A pressure release disk 135 fits onto shoulder 123 of inner container 120 up to the rim 122. Note that in comparison with the pressure release disk 30 of FIG. 2, it is much larger in diameter in relation to the inner container 120. It is preferably constructed of the same materials as described above with reference to pressure release disk 30. When seal cap 130 is seated onto inner container 120, shoulders 132 and 123 fit flush with each other, trapping pressure-relief disk 135 between them. The particular arrangement shown in FIG. 7 is designed to provide multiple bearing points, each of which create a pressure seal.

Specifically, three bearing points are shown at 136, 137 and 138. The first bearing point 136 is created at a chamfer created by an adjacent edge of the flange 121 and between shoulder 132 and the central portion 131 of the bottom of seal cap 130.

The second bearing point 137 is created by an annular groove 140 which is formed in shoulder 132. The inner edge of the shoulder 132 defining the groove 140 is relatively sharp, and any pressure which may escape past bearing point 136 will tend to force the pressure release disk at this point into groove 140. This movement brings the top surface of pressure release disk against a bearing point on shoulder 137 at the groove 140, creating a further sealing point.

The third bearing point 138 occurs where the outermost edge of shoulder 132 bears against the inner edge of rim 122, again creating a further seal against the pressure release disk 135 trapped between these two surfaces. The cooperation of these three bearing points provide a fail-safe seal against leakage of the substance being digested even under severe temperature and pressure conditions.

Referring again to FIGS. 5, 6 and 7, seal cap 130 has a vent 142 which extends between the bottom portion 131 of seal cap 130 and a pressure relief head 143 of reduced diameter. The outlet of vent 142 in the radial wall of pressure relief head 143 is adapted to receive a vent tube 145, as is shown in FIG. 6.

The components described above with reference to FIGS. 5-7 are constructed of the same materials as identified above with reference to FIGS. 1-4 and exhibit the same characteristics.

Figure 8:
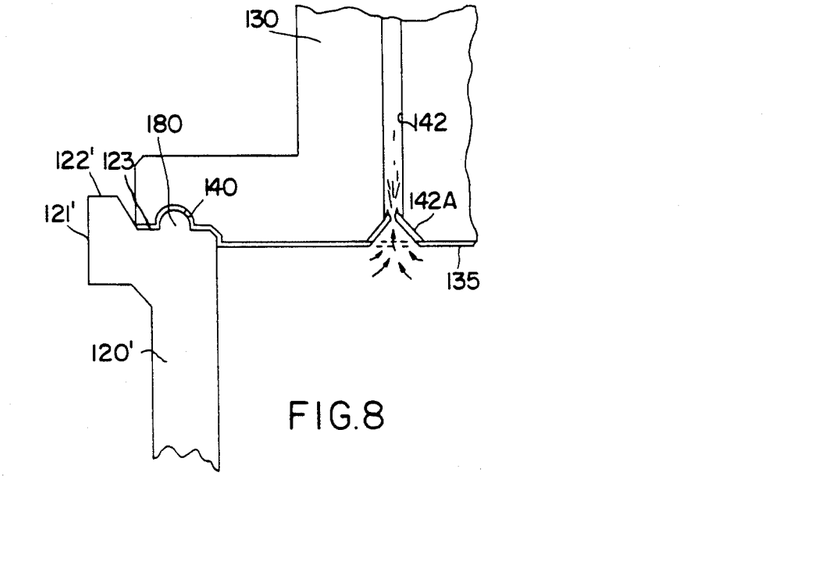
FIG. 8 is a modified embodiment of the vessel shown in FIGS. 5-7 which permits interconnection with a pressure transducer.

Embodiment of FIG. 8

Referring now to FIG. 8, a further embodiment of the invention is shown. Note that with reference to an inner container 120', the seal design includes a raised, integrally molded seal ring 180 formed on shoulder 123 to mate with groove 140'. Pressure release disk is trapped between the mating surfaces of the seal ring 180 and the groove 140', thereby creating an enhanced seal. When under compression from the outer casement assembly 101, pressure release disk is deformed, forming multiple seal points at the places where deformation occurs between adjacent parts. This action results in a "locking" function which prevents radial movement of the pressure release disk 135 during thermal expansion. A tight seal is thereby insured throughout the digestion procedures.

As is also shown in FIG. 8, vent 142 includes a tapered counterbore 142A. If pressure limits are exceeded and pressure release disk 135 ruptures, the contents of inner container 120' escape through vent 142. The counterbore 142A can be made in varying diameters in different seal caps 130 to provide a variable pressure release point while using the same thickness pressure release disk 135. By enlarging the diameter of counterbore 142A the rupture point of pressure release disk 135 is lowered, while reducing the diameter of counterbore 142A raises the rupture point. Thus, a standard thickness pressure release disk 135, i.e., 0.010", can be used, varying the particular seal cap 130 used to vary the counterbore 140A diameter.

The use of a "full cover" pressure release disk 135 offers several advantages. The contents of the inner container 120 or 120' are completely isolated from the other components of the assembly. Thus, contamination of other components is avoided. This, in turn, eliminates the requirement that all of the components be thoroughly washed after each test. When measuring trace elements in parts per billion, even minute traces of residue from an earlier test trapped in a small crevice, crack or corner can give a false test result. In addition, the use of the larger pressure release disk 135 enables the "locking" effect described above between seal ring 180 and groove 140.

Figure 9:
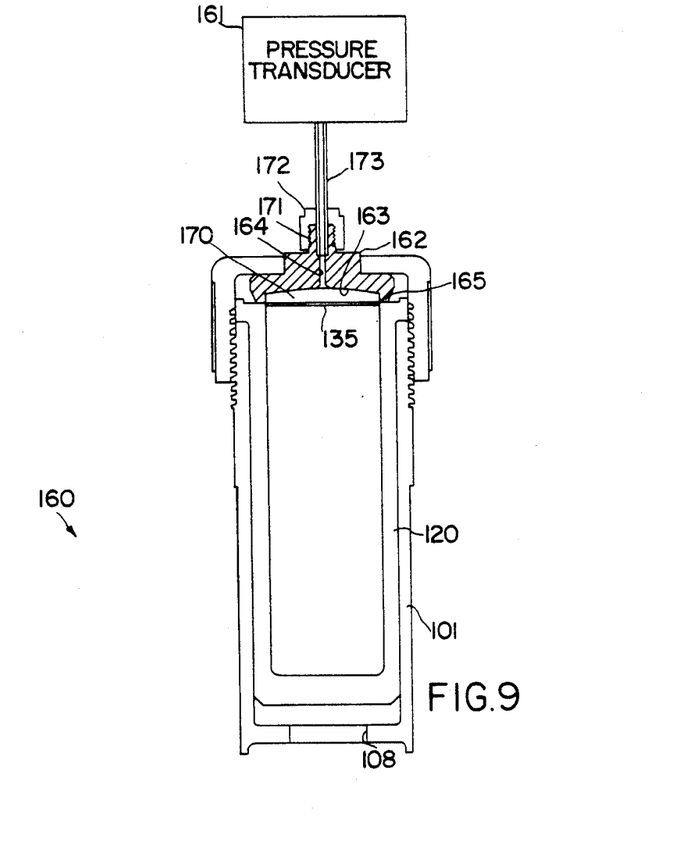
FIG. 9 is an enlarged, fragmentary cross-sectional view of the sealing area of another embodiment of the invention.

Embodiment of FIG. 9

Referring now to FIG. 9, a further modification of the invention is illustrated and generally designated at broad reference numeral 160. Like reference numerals are used for components which are shared with the vessel 100 shown in FIGS. 5-7, each of which are identically constructed and which function as described above. Vessel 160 is modified to permit pressure within the inner container 120 to be transmitted to a pressure transducer 161. Pressure transducer 161 may simply provide a readout of pressure for observation and recordation, may translate the sensed pressure into a corresponding temperature for observation and recordation, or may be transmitted via a feed-back loop to the microwave digester for controlling the pressure and temperature within the inner container 120 by varying the power and/or cycle intervals of the microwave digester.

As is shown in FIG. 8, seal cap 162 is provided with a recessed central portion 163 having a vent 164. Central portion 163 is surrounded by a raised rim 165 around the periphery of seal cap 162 which sits on and mates with shoulder 123 of flange 121. Pressure relief disk 135 extends across the mouth of inner container 120 in spaced-apart relation to the recessed central portion 163 of seal cap 160 and defines a pressure chamber 170 which is completely sealed from communication the interior of the inner container 120, and communicates with vent 164. Seal cap has a threaded nipple 171 through which vent 164 extends and onto which is threaded a matingly threaded nut 172 into which is secured a transducer tube 173. Pressure chamber 170, vent 164, and transducer tube 173 are completely filled with a fluid, for example water. Seal cap 162 is held in sealing engagement with inner container 120 by cap 104, as described above.

The embodiments illustrated in FIGS. 5-8 offer several advantages over the design shown in FIGS. 1-4 which may it more suitable for use under severe conditions. Forces caused by expansion of the inner container 120 are directly downwardly into the expansion gap instead of laterally onto the outer casement 101 and casement cap 104, thereby avoiding the possibility of cracking. The use of a larger pressure relief disk 135 and the use of a single piece seal cap 130 or 162 prevents trace elements from being trapped in these areas. Cleaning vessel components is necessary between procedures is required to achieve reliable results, and the smaller number of parts and the construction of the parts makes cleaning much quicker and more effective. Pressure relief disk 135 may be replaced after each use, or if not damaged, may be cleaned and reused.

The vessel 160 illustrated in FIG. 8 permit the pressure relief disk 135 to function as a pressure diaphragm and protects the sample being tested from potential contamination entering the inner container 120 through the pressure tube 173. As pressure in inner container 120 increases, pressure release disk 135 attempts to bulge outwardly to reduce the volume of the pressure chamber 170. These forces are transmitted by the non-compressible water through the vent 164 and transducer tube 173 to the transducer 161.

Prior art vessels have pressure transducers which tap directly into the container bearing the sample being tested. The pressure lines must be filled with water to protect the transducer from acids. If the pressure line is not properly installed, it can blow out, spraying hot acids into the microwave oven. This is very dangerous both to the equipment and the operator. The pressure lines must be drained, cleaned and refilled after each test. This cannot be done until the vessel has completely cooled and the pressure in the vessel has been reduced to atmospheric pressure.

In contrast, vessel 160 can be removed from the microwave after each test before cooling is complete. Only a small amount of water is lost if the pressure tube 173 should blow out, and the sample is contained within the inner container 120 on other side of pressure release disk 135. Pressure tube 173 need not be cleaned and refilled after each test.

A high temperature and high pressure microwave digestion vessel assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A high temperature, high pressure chemical digestion vessel comprising:
   (a) a microwave transparent inner container having a bottom and integrally-formed cylindrical sidewalls, the upper edge of which sidewalls defines a cylindrical mouth for receiving material to be chemically digested under high pressure and high temperature;
   (b) an enlarged-diameter flange integrally-formed with the cylindrical mouth of said inner container;
   (c) a seal cap having a pressure vent therethrough and an annular seat for being positioned and seated on the flange of said inner container without mechanical attachment;
   wherein said flange includes a raised rim integrally formed around the periphery of said flange and defining an interior, lower shoulder for receiving a pressure release disk, said seal cap including:
   (1) a centrally-disposed bottom surface for being received into the mouth of said inner container and supporting said pressure release disk in the mouth of said inner container;
   (2) an integrally-formed peripheral shoulder of reduced thickness for being positioned on and being supported on the lower shoulder of said inner container with said pressure release disk positioned therebetween; and
   (3) wherein the peripheral shoulder of said seal cap defines an annular groove for mating with the lower shoulder of said flange in sealing relation thereto, said annular groove having a bearing edge for sealingly bearing against said pressure release disk around its entire periphery; said annular groove and the lower shoulder of said flange mating together with said pressure release disk therebetween to provide a sealing surface;
   (d) a microwave transparent outer casement comprising a bottom and integrally-formed cylindrical sidewalls, the upper edge of which outer casement defines a cylindrical mouth for supporting said enlarged flange of said inner container, said sidewalls of said outer casement being of a diameter to receive said inner container therein, and a casement cap being attachable to the upper edge of said cylindrical sidewalls of said outer casement and tightened into pressure-resisting relation with said inner container;
   (e) the replaceable, rupturable pressure release disk formed of a flat sheet material having a predetermined rupture pressure;
   said pressure release disk and said seal cap cooperating to seal the inner container and thereby enclose a substance to be digested in said inner container, said pressure release disk adapted to rupture and release pressure within said inner container if pressure within said inner container reaches said predetermined rupture pressure.

2. A high temperature, high pressure chemical digestion vessel comprising:
   (a) a microwave transparent inner container having a bottom and integrally-formed cylindrical sidewalls, the upper edge of which sidewalls defines a cylindrical mouth for receiving material to be chemically digested under high pressure and high temperature;
   (b) an enlarged-diameter flange integrally-formed with the cylindrical mouth of said inner container;
   (c) a seal cap having a pressure vent therethrough and an annular seat for being positioned and seated on the flange of said inner container without mechanical attachment;
   wherein said flange includes a raised rim integrally formed around the periphery of said flange and defining an interior, lower shoulder for receiving a pressure release disk, said lower shoulder including an integrally formed raised annular ring positioned thereon; said seal cap including:
   (1) a centrally-disposed bottom surface for being received into the mouth of said inner container and supporting said pressure release disk in the mouth of said inner container;

(2) an integrally-formed peripheral shoulder of reduced thickness for being positioned on and being supported on the lower shoulder of said inner container with said pressure release disk positioned therebetween; and (3) wherein the peripheral shoulder of said seal cap defines an annular groove for mating with the annular ring on the lower shoulder of said flange in sealing relation thereto, said annular groove having a bearing edge for sealingly bearing against said pressure release disk around its entire periphery; said annular groove and said annular ring mating together with said pressure release disk therebetween to provide a sealing surface;

(d) a microwave transparent outer casement comprising a bottom and integrally-formed cylindrical sidewalls, the upper edge of which outer casement defines a cylindrical mouth for supporting said enlarged flange of said inner container, said sidewalls of said outer casement being of a diameter to receive said inner container therein, and a casement cap being attachable to the upper edge of said cylindrical sidewalls of said outer casement and tightened into pressure-resisting relation with said inner container;

(e) the replaceable, rupturable pressure release disk formed of a flat sheet material having a predetermined rupture pressure;

said pressure release disk and said seal cap cooperating to seal the inner container and thereby enclose a substance to be digested in said inner container, said pressure release disk adapted to rupture and release pressure within said inner container if pressure within said inner container reaches said predetermined rupture pressure.

3. A chemical digestion vessel according to claim 2, wherein said outer casement includes a through opening in a bottom surface thereof for receiving an elongated object therethrough to assist in removal of said inner container from said outer casement.

4. A chemical digestion vessel according to claim 2, wherein said seal cap includes an upwardly-projecting pressure-relief head of reduced dimension having a pressure-relief opening therein, and wherein said outer casement cap includes an opening therein for receiving said pressure-relief head therethrough.

5. A chemical digestion vessel according to claim 2, wherein said casement cap and an upper end portion of the upper cylindrical walls of said casement include mating threads.

6. A chemical digestion vessel according to claim 2, wherein said inner container is shorter in length than the length of said outer casement wherein an expansion gap is defined between the bottom of said inner container and the bottom of said outer-casement to accommodate expansion of said inner container as microwave digestion takes place.

7. A chemical digestion vessel according to claim 2, wherein said outer casement is dimensioned for receiving said inner container therein along substantially the entire length of said inner container and providing support to said inner container along substantially the entire length of said inner container.

8. A chemical digestion vessel according to claim 2, wherein said seal cap includes:

(a) a raised peripheral rim formed on the bottom of said seal cap for sealingly engaging said pressure relief disk adjacent its periphery and defining a centrally-disposed void between the bottom of said seal cap and said pressure relief disk communicating with said pressure vent for being filled with a pressure transmitting fluid sealingly separated from the substance to be digested in the vessel and responsive to pressure-induced movement of said pressure relief disk; and (b) fluid connector means for interconnecting said seal cap with a pressure transducer for transmitting pressure-induced movement of said pressure-transmitting fluid to a pressure transducer whereby pressure in said inner container is continually monitored without permitting the substance being digested in the inner container to escape.

9. A chemical digestion vessel according to claim 2, wherein the bottom of said seal cap interior of said raised rim is concave.

10. A chemical digestion vessel according to claim 2, wherein said container and said outer casement are each transparent to microwave radiation.

11. A chemical digestion vessel according to claim 2 or 10, wherein said outer casement is formed of polyetherimide resin and said inner container is formed of perfluoroalkoxy resin.

12. A high temperature, high pressure chemical digestion vessel comprising:

(a) a microwave transparent inner container having a bottom and integrally-formed cylindrical sidewalls, the upper edge of which sidewalls defines a cylindrical mouth for receiving material to be chemically digested under high pressure and high temperature;

(b) an enlarged-diameter flange integrally-formed with the cylindrical mouth of said inner container;

(c) a seal cap having a pressure vent therethrough and an annular seat for being positioned and seated on the flange of said inner container without mechanical attachment;

wherein said flange includes a raised rim integrally formed around the periphery of said flange and defining an interior, lower shoulder for receiving a pressure release disk, said seal cap including:

(1) a centrally-disposed bottom surface for being received into the mouth of said inner container and supporting said pressure release disk in the mouth of said inner container;

(2) an integrally-formed peripheral shoulder of reduced thickness for being positioned on and being supported on the lower shoulder of said inner container with said pressure release disk positioned therebetween; and (3) wherein the peripheral shoulder of said seal cap defines an annular groove for mating with the lower shoulder of said flange in sealing relation thereto, said annular groove having a bearing edge for sealingly bearing against said pressure release disk around its entire periphery; said annular groove and the lower shoulder of said flange mating together with said pressure release disk therebetween to provide a sealing surface;

(d) a microwave transparent outer casement comprising a bottom and integrally-formed cylindrical sidewalls, an upper edge of which outer casement defines a cylindrical mouth for supporting said enlarged flange of said inner container, said sidewalls of said outer casement being of a diameter to receive said inner container therein, and a casement cap being attachable to the upper edge of said cylindrical sidewalls of said outer casement and tightened into pressure-resisting relation with said inner container;

(e) the replaceable, rupturable pressure release disk formed of a flat sheet material having a predetermined rupture pressure; said casement cap, said pressure release disk and said seal cap being arranged so as to seal the inner container and thereby enclose a substance to be digested in said inner container, said pressure release disk adapted to rupture and release pressure within said inner container if pressure within said inner container reaches said predetermined rupture pressure; and (f) chamber means cooperating with said seal cap and with said pressure release disk on the side of the pressure release disk sealed from communication with said inner container for transmitting pressure within said inner container to pressure sensing means exterior to said vessel.

13. A high temperature, high pressure chemical digestion vessel comprising:

(a) a microwave transparent inner container having a bottom and integrally-formed cylindrical sidewalls, the upper edge of which sidewalls defines a cylindrical mouth for receiving material to be chemically digested under high pressure and high temperature;

(b) an enlarged-diameter flange integrally formed with the cylindrical mouth of said inner container;

(c) a seal cap having a pressure vent therethrough and an annular seat for being positioned and seated on the flange of said inner container without mechanical attachment;

wherein said flange includes a raised rim integrally formed around the periphery of said flange and defining an interior, lower shoulder for receiving a pressure release disk, said lower shoulder including an integrally formed raised annular ring positioned thereon; said seal cap including:

(1) a centrally-disposed bottom surface for being received into the mouth of said inner container and supporting said pressure release disk in the mouth of said inner container;

(2) an integrally-formed peripheral shoulder of reduced thickness for being positioned on and being supported on the lower shoulder of said inner container with said pressure release disk positioned therebetween; and (3) wherein the peripheral shoulder of said seal cap defines an annular groove for mating with the annular ring on the lower shoulder of said flange in sealing relation thereto, said annular groove having a bearing edge for sealingly bearing against said pressure release disk around its entire periphery; said annular groove and said annular ring mating together with said pressure release disk therebetween to provide a sealing surface;

(d) a microwave transparent outer casement comprising a bottom and integrally-formed cylindrical sidewalls, an upper edge of which outer casement defines a cylindrical mouth for supporting said enlarged flange of said inner container, said sidewalls of said outer casement being of a diameter to receive said inner container therein, and a casement cap being attachable to the upper edge of said cylindrical sidewalls of said outer casement and tightened into pressure-resisting relation with said inner container;

(e) the replaceable, rupturable pressure release disk formed of a flat sheet material having a predetermined rupture pressure; said casement cap, said pressure release disk and said seal cap being arranged so as to seal the inner container and thereby enclose a substance to be digested in said inner container, said pressure release disk adapted to rupture and release pressure within said inner container if pressure within said inner container reaches said predetermined rupture pressure; and (f) chamber means cooperating with said seal cap and with said pressure release disk on the side of the pressure relief disk sealed from communication with said inner container for transmitting pressure within said inner container to pressure sensing means exterior to said vessel.

14. A chemical digestion vessel according to claim 13, wherein said chamber means cooperating with said seal cap includes:

(a) a raised peripheral rim formed on the bottom of said seal cap for sealingly engaging said pressure relief disk adjacent its periphery and defining a centrally-disposed void between the bottom of said seal cap and said pressure relief disk communicating with said pressure vent for being filled with a pressure transmitting fluid sealingly separated from the substance to be digested in the vessel and responsive to pressure-induced movement of said pressure relief disk; and (b) fluid connector means for interconnecting said seal cap with a pressure transducer for transmitting pressure-induced movement of said pressure-transmitting fluid to a pressure transducer whereby pressure in said inner container is continually monitored without permitting the substance being digested in the inner container to escape.

15. A chemical digestion vessel according to claim 14, wherein the bottom of said seal cap interior of said raised rim is concave.

* * * * *